United States Patent
Kobayashi

(10) Patent No.: US 7,199,552 B2
(45) Date of Patent: Apr. 3, 2007

(54) CONTROL CIRCUIT APPARATUS AND POWER SUPPLY CIRCUIT CONTROL METHOD

(75) Inventor: Tokio Kobayashi, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 11/032,024

(22) Filed: Jan. 11, 2005

(65) Prior Publication Data
US 2005/0162146 A1   Jul. 28, 2005

(30) Foreign Application Priority Data
Jan. 16, 2004   (JP)   ............... P2004-008996

(51) Int. Cl.
*H02J 7/00* (2006.01)
*G05F 1/70* (2006.01)
*G04F 8/00* (2006.01)

(52) U.S. Cl. .............. 320/106; 323/207; 323/318

(58) Field of Classification Search .......... 323/18, 323/207, 318; 320/106, 104, 114, 132, 110, 320/149, 136; 363/21, 13
See application file for complete search history.

(56) References Cited

U.S. PATENT DOCUMENTS

| | | | | |
|---|---|---|---|---|
| 5,146,395 A * | 9/1992 | McKie | ............... | 363/13 |
| 6,169,680 B1 * | 1/2001 | Matsui et al. | ............... | 363/21.05 |
| 6,191,551 B1 * | 2/2001 | Fischer et al. | ............... | 320/106 |
| 6,211,681 B1 * | 4/2001 | Kagawa et al. | ............... | 324/426 |
| 6,380,711 B2 * | 4/2002 | Fischer et al. | ............... | 320/106 |
| 6,534,950 B2 * | 3/2003 | LeBoe | ............... | 320/104 |
| 2001/0000423 A1 * | 4/2001 | Fischer et al. | ............... | 320/114 |
| 2002/0175657 A1 * | 11/2002 | Leboe | ............... | 320/132 |
| 2003/0099119 A1 * | 5/2003 | Yamada et al. | ............... | 363/21.12 |

FOREIGN PATENT DOCUMENTS

| | | |
|---|---|---|
| EP | 1 221 753 A2 | 7/2002 |
| JP | 58-123321 | 7/1983 |
| JP | 2001-326120 | * 11/2001 |
| JP | 2002-027744 | 1/2002 |

OTHER PUBLICATIONS

Singapore Search and Examination Report mailed Sep. 27, 2005.

* cited by examiner

*Primary Examiner*—Don Wong
*Assistant Examiner*—Hung Tran Vy
(74) *Attorney, Agent, or Firm*—Rader Fishman & Grauer PLLC; Ronald P. Kananen

(57) ABSTRACT

A microcomputer outputs a command to a control IC to operate first and second loads. The control IC sets first and second DC/DC converters' on-state to operate the first and second loads. The first DC/DC converter converts a voltage of power supplied from a power supply from 8.4V to 1.5V and supplies it to a constant current circuit. The constant current circuit calculates a current value of a load current to be consumed in the first load and the second load to which power is supplied via the second DC/DC converter and compares it with an electrical current value at which the utmost conversion efficiency is achievable in the first DC/DC converter. If the load current is smaller than that value, the constant current circuit supplies a surplus power to a charging battery, and if the load current is greater than that value, it receives a deficient power from the charging battery.

7 Claims, 4 Drawing Sheets

CONTROL CIRCUIT APPARATUS AND POWER SUPPLY CIRCUIT CONTROL METHOD

CROSS REFERENCE TO RELATED APPLICATIONS

The present document is based on Japanese Priority Document JP2004-008996, filed in the Japanese Patent Office on Jan. 16, 2004, the entire contents of which being incorporated herein by reference.

BACKGROUND OF THE INVENTION

1. Field of the Invention

The present invention relates to a control circuit apparatus and, in particular, to a control circuit apparatus which enables a reduction in power consumption by improving the conversion efficiency in its voltage converter using a thin-film choke coil.

2. Description of Related Art

Low power consumption is advancing in electronic control apparatuses typically digital still cameras, digital video cameras and the like.

As to this low power consumption in electronic apparatuses, for example, an arrangement is proposed in which a circuit system for a constant voltage operable by controlling the operation of a secondary active clamp circuit is directly driven by an analog PWM (Pulse Width Modulation) control circuit in order to reduce an input power to its voltage control circuit system, to improve a power conversion efficiency and to achieve a low power consumption (for example, Patent Document 1: Japanese Patent Application Publication No. 2002-027744).

SUMMARY OF THE INVENTION

According to this technology, however, because its circuitry inevitably becomes large-scaled, there is a problem in that a compact and light-weight design becomes difficult.

Generally, in an electronic control apparatus, an output voltage supplied from a power supply is once converted to a predetermined voltage, and it is supplied to a load side wherein to carry out various processing. However, in a digital video camera, HDD (hard disc drive), DVD (digital versatile disc) drive unit or the like, fluctuation in the output load current is extremely large, and power consumed in the load side is not constant. Therefore, in the stage of design, a voltage converter circuit is designed in consideration of a maximum load. For this reason, in the case of a maximum load applied, the voltage conversion efficiency becomes highest: however, in the case where its load is not maximum, the conversion efficiency will drop. It is infrequent that an operation under the maximum load is performed. As a result, there is a problem that low power consumption cannot be achieved in such instances.

The present invention is contemplated in consideration of the aforementioned circumstances, and, in particular, to achieving low power consumption in the control circuit apparatus by providing a constant current circuit between a voltage converter and its load so as to be able to improve the voltage conversion efficiency therein.

A control circuit apparatus of the present invention is characterized by including a first voltage converter which uses a thin film choke coil for converting a voltage of power to be supplied to a load in a subsequent stage, from a first voltage to a second voltage, and a constant current circuit for maintaining a current value of power supplied at the second voltage from the voltage converter at a predetermined current value, irrespective of power consumption in the load.

The above may further include a calculation circuit for calculating a current value of power consumed in the load; and a charging battery, which is chargeable with a portion of the power supplied from the first voltage converter or which supplies power to the load; wherein if the current value of power consumption calculated by the calculation circuit is smaller than a predetermined current value, the constant current circuit makes the charging battery charge a portion of the current of power corresponding to a difference between the predetermined current value and the current value of power consumption; and if the current value of power consumption calculated by the calculation circuit is greater than the predetermined current value, the constant current circuit makes the charging battery supply power corresponding to the difference between the predetermined current value and the current value of power consumption.

The load described above may be provided as a second voltage converter for converting a voltage of power supplied from the constant current circuit from the second voltage to a third voltage.

A power supply circuit control method of the present invention includes the steps of converting a voltage of power to be supplied to a load in a subsequent stage from a first voltage to a second voltage by a first voltage converter with the use of thin film choke coil; and maintaining a current value of power supplied at the second voltage from the voltage converter at a predetermined current value by using a constant current circuit, irrespective of power consumption in the load.

The above may further include the steps of calculating a current value of power consumed in the load by a calculating circuit; charging a charging battery with a portion of the power supplied from the first voltage converter or supplying power to the load from the charging battery; wherein if the current value of power consumption calculated by the calculation circuit is smaller than a predetermined current value, the constant current circuit makes the charging battery charge power corresponding to a difference between the predetermined current value and the current value of power consumption; and if the current value of power consumption calculated by the calculation circuit is greater than the predetermined current value, the constant current circuit makes the charging battery supply power corresponding to the difference between the predetermined current value and the current value of power consumption.

The apparatus according to the present invention can be used in a state at a higher level of voltage conversion efficiency, and as a result, enables a reduction in power consumption therein.

DESCRIPTION OF THE EMBODIMENT(S)

Figure 1:
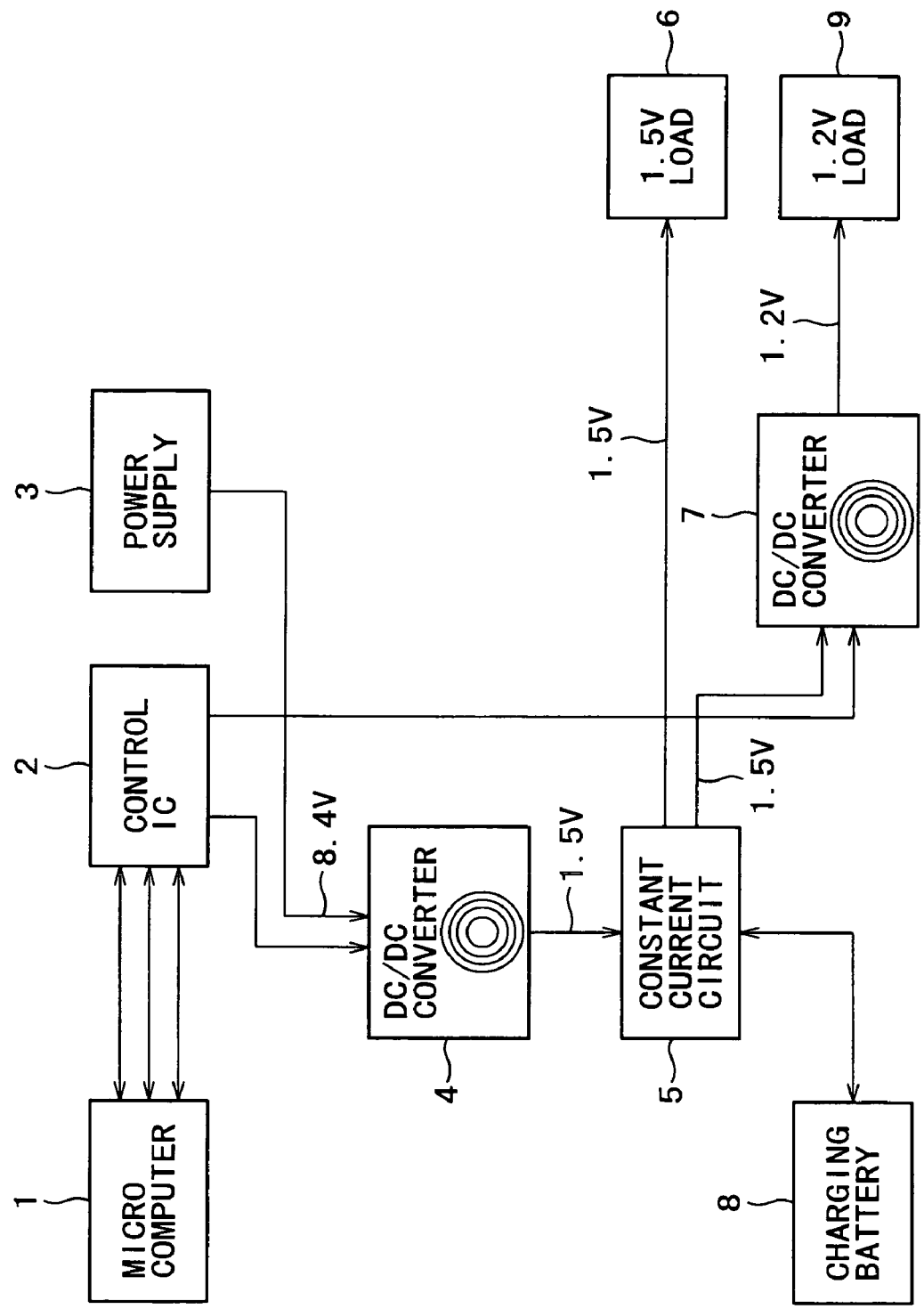
FIG. 1 is a block diagram explaining an electronic control circuit according to an embodiment of the present invention.

An embodiment of the present invention will be described in the following. An exemplary correspondence between the invention as claimed in this specification and its embodiment of the present invention is as follows. This description is to verify that the embodiment which supports the invention claimed in this specification is duly stated in this specification. Therefore, even if there arises any other embodiment which corresponds to the invention claimed within the scope of the present invention but is not described explicitly in the embodiment of the present invention here, it should be understood that it does not mean that any such embodiment does not correspond to the present invention. Conversely, even if an exemplary embodiment is described here as corresponding to the invention, this does not mean that the embodiment thereof does not correspond to any other invention other than this.

Further, this description is not meant to include the whole aspect and scope of the invention duly claimable in this specification. In other words, although this description concerns the invention described in this specification, it does not preclude the existence of any other inventions which are not claimed in this application, or which may arise in the future as divisional, amendment, or additional applications.

A control circuit apparatus according to an aspect of the embodiment of the present invention is characterized by including a first voltage converter (for example, a DC/DC converter 4 in FIG. 1) which uses a thin-film choke coil for converting a voltage of a power to be supplied to a load in a subsequent stage, from a first voltage to a second voltage, and a constant current circuit (for example, a constant current circuit 5 in FIG. 1) for maintaining a current value of the power supplied at the second voltage supplied from the voltage converter at a predetermined current value, irrespective of power consumption in the load.

The control circuit apparatus may further include: a calculation circuit (for example, a power consumption monitoring unit 32 in FIG. 4) for calculating a current value of power consumed in the load; and a charging battery, which is chargeable with a portion of the power supplied from the first voltage converter or which supplies power to the load, wherein if the current value of the power consumption calculated by the calculation circuit is smaller than a predetermined current value, the constant current circuit makes the charging battery charge a portion of the power corresponding to the difference between the predetermined current value and the current value of the power consumption; and if the current value of power consumption calculated by the calculation circuit is greater than the predetermined current value, the constant current circuit makes the charging battery supply power corresponding to the difference between the predetermined current value and the current value of power consumption.

A power supply circuit control method of the present invention includes the steps of: converting a voltage of power to be supplied to a load in a subsequent stage, from a first voltage to a second voltage by a first voltage converter with the use of thin film choke coil; and maintaining a current value of power supplied at the second voltage from the voltage converter at a predetermined current value by using a constant current circuit, irrespective of power consumption in the load.

The power supply circuit control method may further include the steps of: calculating a current value of power consumed in the load by a calculating circuit; charging a charging battery with a portion of the power supplied from the first voltage converter or supplying power to the load from the charging battery; wherein if the current value of power consumption calculated by the calculation circuit is smaller than a predetermined current value, the constant current circuit makes the charging battery charge power corresponding to a difference between the predetermined current value and the current value of power consumption; and if the current value of power consumption calculated by the calculation circuit is greater than the predetermined current value, the constant current circuit makes the charging battery a supply power corresponding to a difference between the predetermined current value and the current value of power consumption.

The load described above may be provided as a second voltage converter (for example, a DC/DC converter 7 in FIG. 1) for converting the voltage of power supplied from the constant current circuit from the second voltage to a third voltage.

A control circuit apparatus according to an embodiment of the present invention will be described in the following by referring to the accompanying drawings.

A control circuit apparatus shown in FIG. 1 is an apparatus to be incorporated in various types of electronic control equipment, and functions to electrically control the operations of various drive units in the electronic control equipment. A microcomputer 1 in the control circuit apparatus is comprised of a CPU (Central Processing Unit), a RAM (Random Access Memory) and a ROM (Read Only Memory), in which the CPU reads out a program incorporated in ROM and executes it by deploying in RAM as required. Further the microcomputer 1 functions to control the whole control circuit apparatus, and issues a command to operate loads 6, 9, to be described later, by sending a predetermined command to a control IC 2.

The control IC 2, in response to a command given from the microcomputer 1, controls on/off of DC/DC (Direct Current to Direct Current) converter 4 or 7 to allow actual operation of load 6 or 9 in a subsequent stage.

The DC/DC converter 4, which is under control of the control IC 2, converts a voltage of power supplied from a power supply 3 from 8.4V to 1.5V and supplies it to a constant current circuit 5. In order to be able to receive a power supply in such a state that ensures the utmost efficiency of voltage conversion by the DC/DC converter 4, the constant current circuit 5 monitors a power (a current value) consumed in the load 6 and a power consumed in the load 9 via the DC/DC converter 7. When a surplus power exists, the constant current circuit 5 supplies the surplus power to a charging battery 8 for charging itself, or when power is deficient, the constant current circuit 5 causes the deficient power to be supplied from the charging battery 8 to the load 6 and to the DC/DC converter 7.

The load 6 operable at 1.5V of power supplied from the DC/DC converter 4 via the constant current circuit 5 is, for example, an electric motor or the like. The DC/DC converter 7 converts a 1.5V power supplied from the DC/DC converter 4 via the constant current circuit 5 to a 1.2V power, and supplies it to the load 9 operable at 1.2V power.

The operation of the control circuit apparatus shown in FIG. 1 will next be described. The microcomputer 1 issues a command to the control IC 2 to allow operation of the loads 6, 9. The control IC 2 allows the DC/DC converters 4, 7 to be set—a state applied with a voltage so as to supply power to the loads 6 and 9 (to be set on-state).

The DC/DC converter 4 converts an 8.4V power supplied from the power supply 3 to a 1.5V power supply voltage and supplies it to the constant current circuit 5. The constant current circuit 5 supplies a 1.5V power to the load 6, thereby enabling it to execute a predetermined operation, and also supplies a 1.5V power to DC/DC converter 7. The DC/DC converter 7 converts a 1.5V power supplied from the constant current circuit 5 to a 1.2V power and supplies it to the load 9 to execute its operation.

By way of example, the constant current circuit 5 monitors a state of power consumptions in the load 6 and the load 9 to which its power is supplied via the DC/DC converter 7 while supplying a power to the load 6 and to the DC/DC converter 7, and controls such that its current value is maintained at the highest conversion efficiency in the DC/DC converter 4 that is achievable. More specifically, the constant current circuit 5, if there is a surplus in the power supplied from the DC/DC converter 4, supplies the surplus power to the charging battery 8 for charging itself, and if there is a deficiency in the power, the constant current circuit 5 receives a power supply from the charging battery 8.

Figure 2:
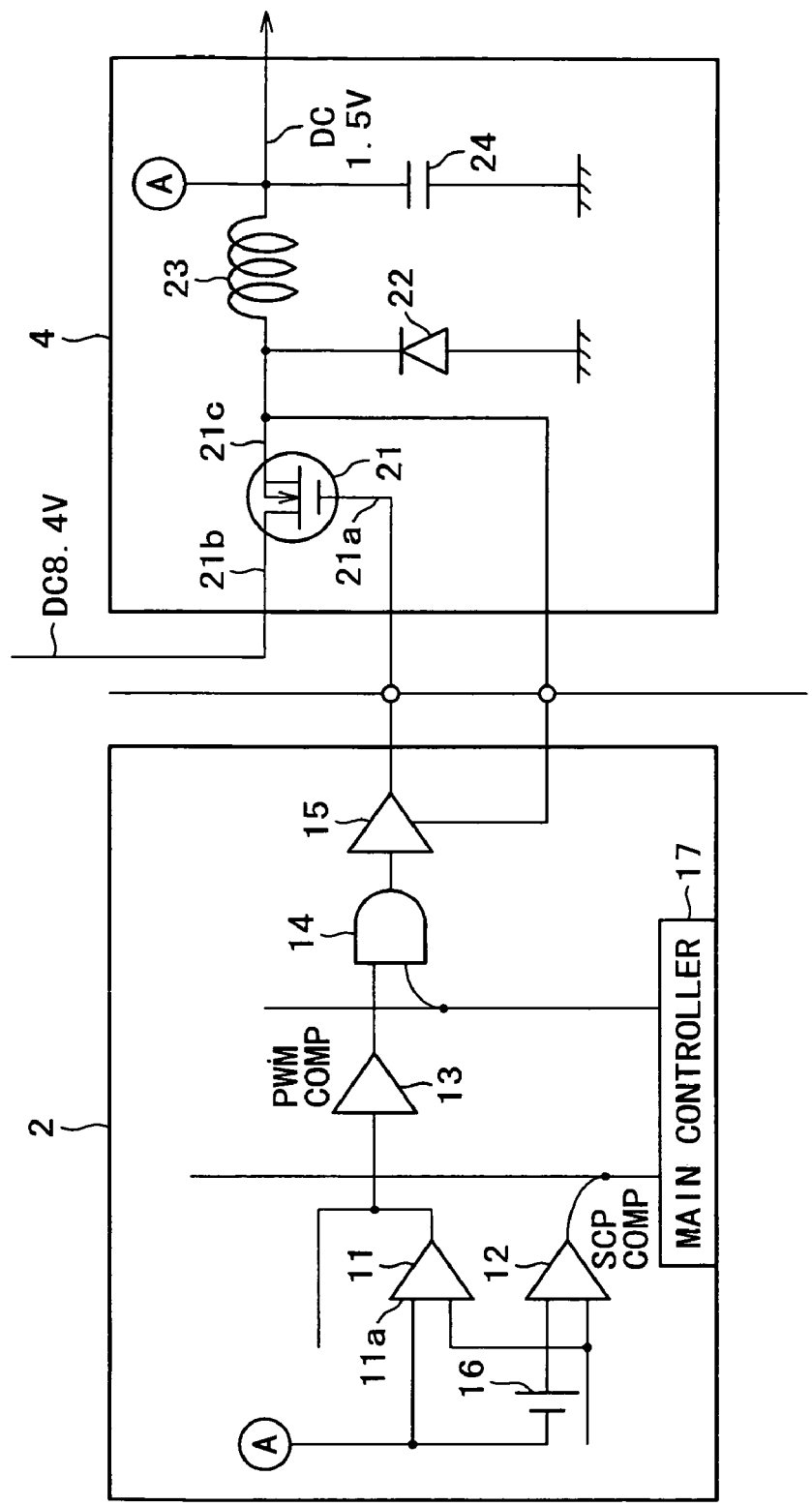
FIG. 2 is a block diagram explaining a control IC and a DC/DC converter of FIG. 1.

In the next description, by referring to FIG. 2, detailed configurations of the control IC 2 and the DC/DC converter 4 will be described.

A comparator 11 in the control IC 2 supplies a feedback signal supplied from the DC/DC converter 4 via a terminal A to a PWM (Pulse Width Modulation) comparator 13. A SCP (Short Circuit Protection function) comparator 12 supplies a short circuit protection signal of the control IC 2 to a main controller 17 using a voltage supplied from a power supply 16.

By modulating the feedback signal supplied from the comparator 11 into a PWM signal and changing the duty ratio thereof, the PWM comparator 13 supplies it to an AND circuit 14. When supplied with an on-signal from the main controller 17, the AND circuit 14 supplies the feedback signal as a drive pulse to the DC/DC converter 4 via an amplifier 15, thereby controlling the DC/DC converter 4 accordingly and also supplying the feedback signal thereto.

On the basis of a drive pulse supplied from the control IC 2 to a gate terminal 21a, an FET (Field Effect Transistor) 21 in DC/DC converter 4 supplies an 8.4V DC power supplied from the power supply 3 via a drain terminal 21b to a thin film choke coil 23 via a source terminal 21c. A diode 22, the thin film choke coil 23 and a capacitor 24 in combination convert the voltage of power supplied from the FET 21 from 8.4V to 1.5V and rectify it to supply it to the constant current circuit 5. At this instant, the terminal A supplies a feedback signal to the control IC 2.

The voltage conversion ratio and the voltage conversion efficiency of the DC/DC converter 4 are determined depending on the characteristics of this thin film choke coil 23. Although it is usually possible to change the characteristics thereof by changing the number of windings of the coil, because the thin film choke coil is manufactured using a thin film process, it is not possible to adjust the number of windings. As a result, it becomes very difficult to change the characteristics thereof.

Figure 3:
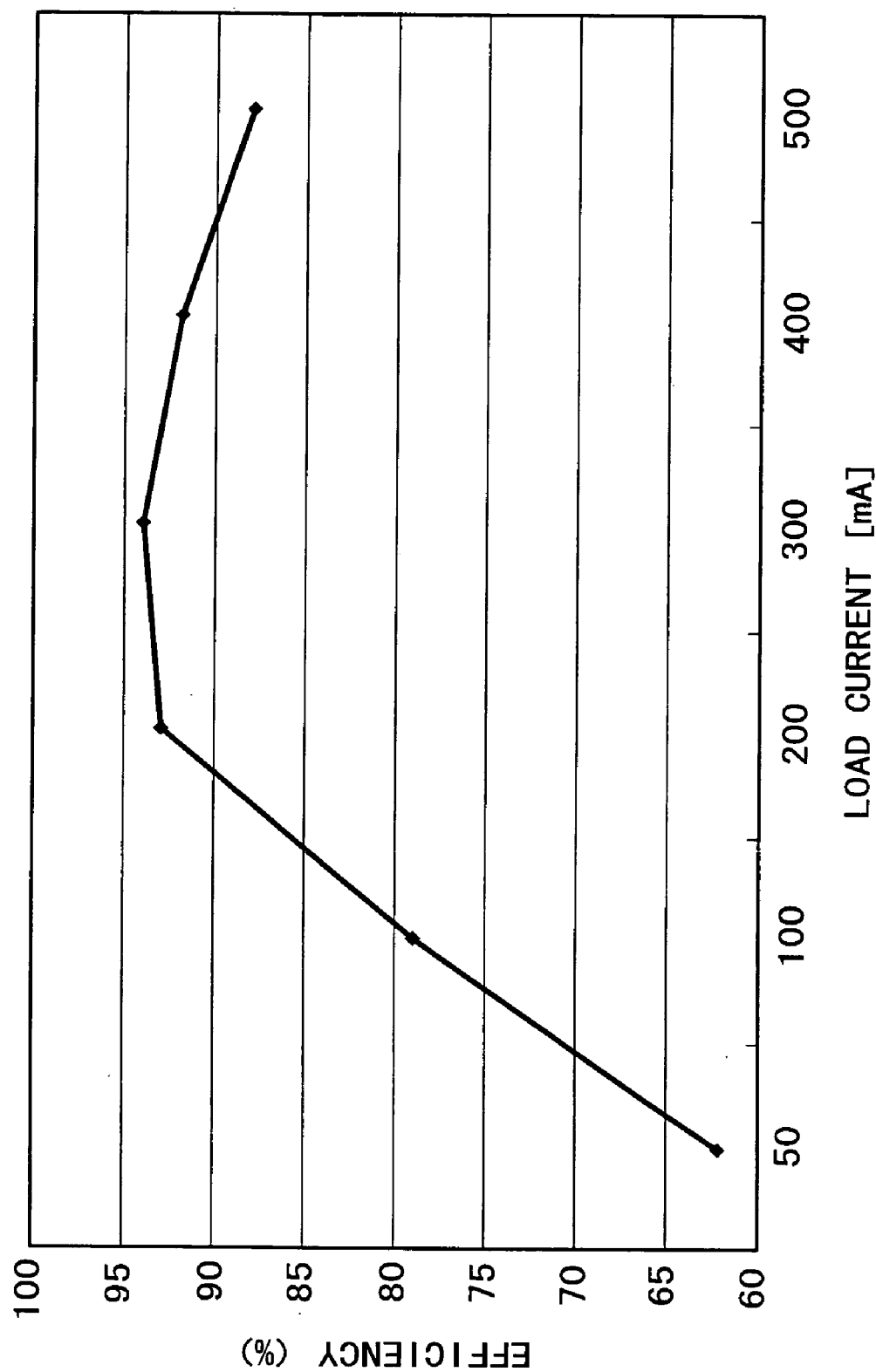
FIG. 3 is a graph explaining conversion efficiencies of the DC/DC converter of FIG. 1.

FIG. 3 shows conversion efficiencies of the DC/DC converter 4. The conversion efficiency of the DC/DC converter 4 becomes approximately 63% relative to a 50 mA current consumed in the loads 6 and 9, approximately 79% relative to a 100 mA current, approximately 93% relative to a 200 mA current, 94% relative to a 300 mA current, approximately 92% relative to a 400 mA current, and approximately 88% relative to a 500 mA current.

Thus, it is shown that when a load current which is a current of power consumed in the loads 6 and 9 is in a range from 200 mA to 400 mA, a high efficiency in excess of 90% is achievable. Further, when the load current is 300 mA, the maximum efficiency is obtained; however, when its load current is outside the range from 200 mA to 400 mA, its efficiency drops drastically.

Figure 4:
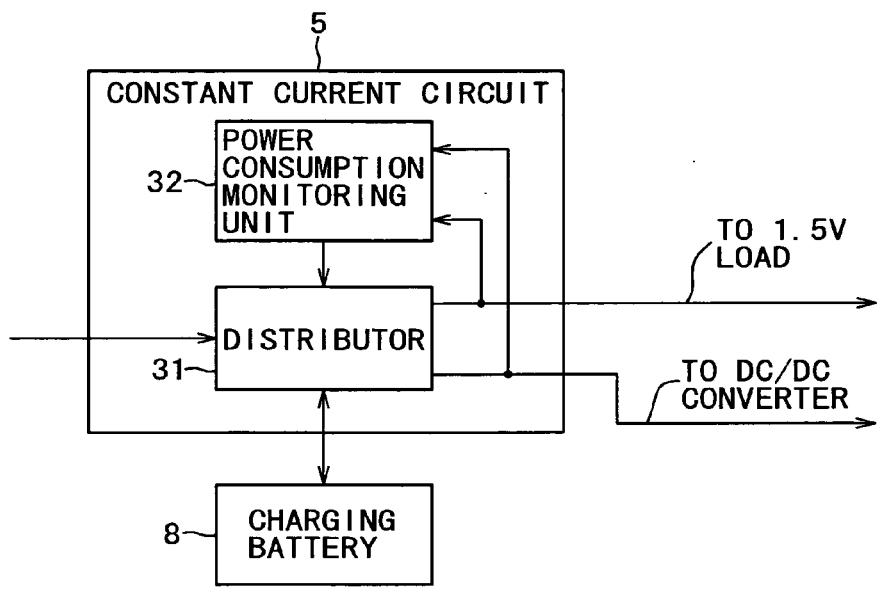
FIG. 4 is a block diagram explaining a constant current circuit of FIG. 1.

Next, by referring to FIG. 4, a detailed configuration of the constant current circuit 5 will be described.

A current consumption monitoring unit 32 monitors a total value of a current value of power supplied to the load 6 and a current value supplied via the DC/DC converter 7 to be consumed in the load 9. The current consumption monitoring unit 32 controls a distributor 31 such that if the total value is smaller than 300 mA at which the maximum conversion efficiency is achievable, a surplus current of power is supplied to the charging battery 8 for charging itself, and if the total value is greater than 300 mA, it receives a power supply from the charging battery 8.

The distributor 31, in response to a command from the power consumption monitoring unit 32, distributes and supplies power to the load 6 and the load 9 via the DC/DC converter 7 and the charging battery 8, as well as receives power supply from the charging battery 8 as required.

Figure 5:
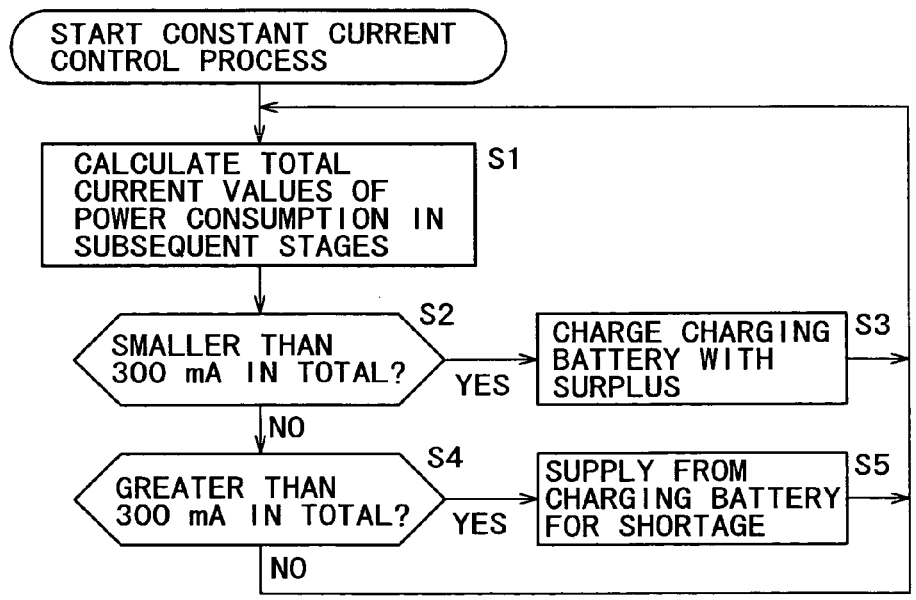
FIG. 5 is a flowchart showing steps of processing in a constant current control.

Next, a constant current control process by the constant current circuit 5 will be described with reference to FIG. 5.

In step S1 (FIG. 5), the power consumption monitoring unit 32 calculates a total value of a current value of power supplied to the load 6 and a current value of power supplied to the load 9 via the DC/DC converter 7.

In step S2, the power consumption monitoring unit 32 determines whether or not a total current value of power consumption calculated is less than 300 mA. For example, if the total current value is determined to be less than 300 mA, the distributor 31 is controlled in step S3 to supply to the charging battery 8 a surplus power corresponding to a difference between an actually-consumed power and 300 mA and to distribute the rest of power to the load 6 and the DC/DC converter 7, after that the process returns to step S1.

If it is determined in step S2 that the total value is not less than 300 mA, the power consumption monitoring unit 32 determines in step S4 whether or not the total value is larger than 300 mA, and if it is determined, for example, to be larger than that, the process advances to step S5.

In step S5, the power consumption monitoring unit 32 controls the distributor 31 to draw out a power corresponding to a load current exceeding 300 mA from the charging battery 8 and supply it to be distributed to the load 6 and the DC/DC converter 7. After that, the process returns to step S1.

In step S4, if the total load current is determined not to be greater than 300 mA, that is, the current consumption is 300 mA, the process returns to step S1 to repeat the subsequent steps.

By the processes described above, the DC/DC converter 4 is enabled to continue its voltage conversion in the state achievable of the utmost efficiency. That is, as shown in FIG. 3, if a load current is, for example, 50 mA, although the power loss due to voltage conversion is 27.75 (mW) (=1.5 (V)×50 (mA)×(1−0.63)), the power loss becomes 27 (mW) (=1.5 (V)×300 (mA)×(1−0.94)), thereby enabling—the reduction in the power loss by enabling operation at 300 mA, at which the conversion efficiency is highest by supplying a power supply to the charging battery 8.

According to the arrangement described above, the constant current circuit 5 controls the current value of the power supplied from the DC/DC converter 4 so as to always be the utmost conversion efficiency in the DC/DC converter 4. Therefore even if a DC/DC converter is used, whose characteristic cannot be changed by changing the number of windings of its coil as the DC/DC converter 4 using the thin-film coil, it becomes possible to continue its use under the utmost conversion efficiency condition, resulting in the achievement of reduced power consumption.

In the case where the DC/DC converter 4 is designed such that its conversion efficiency becomes highest at the maximum output (at a maximum current), it is very rare for it to be operated at the maximum output. Therefore, in a normal operating condition, the charging battery 8 will be constantly charged fully with power, thereby allowing it to be used also as a power supply of, for example, a stroboscope, as required. Further, by disposing an additional DC/DC converter for converting from 1.5V to a relatively closer voltage of 1.2V in a subsequent stage as the DC/DC converter 7, it can convert at a higher efficiency than, for example, converting from 8.4V to 1.2V (generally, the smaller a difference between a voltage prior to its conversion and a voltage after its conversion is, the higher the efficiency). As a result, still more reduction in power consumption becomes achievable.

Still further, in the above description, as an example of DC/DC converter 4, it has been described the converter for converting from 8.4V to 1.5V. However, it is not limited thereto, and any DC/DC converter for converting from any other voltage to another voltage may be used. In this case, a constant current circuit capable of maintaining a current value, at which the highest conversion efficiency is achievable corresponding to the characteristics of a DC/DC converter to be used, may be used. Therefore, although it has been described by way of the exemplary case in which the constant current circuit 5 coordinates between charging of the charging battery or receiving a power supply therefrom after comparing the load current with 300 mA, it should be noted that it is not limited thereto, and it may be compared with any other current value.

As described hereinabove, by disposing the constant current circuit in the subsequent stage of the DC/DC converter which uses the thin film choke coil so as to supply a current value corresponding to the characteristics of the DC/DC converter to the loads in the subsequent stages, it becomes possible always to utilize the power in the nearly utmost efficiency condition in the DC/DC converter. As a result, it becomes possible to achieve reduced power consumption over the whole of the system.

In this specification, the steps describing the sequences of the process set forth should be understood to include not only those processes to be executed in time series in the order described above but also processes to be executed in parallel or separately even if they are not executed in time series.

What is claimed is:

1. A control circuit apparatus comprising:
   a voltage converter which uses a thin film choke coil for converting a voltage of power to be supplied to a load in a subsequent stage, from a first voltage to a second voltage;
   a constant current circuit for maintaining a current value of power supplied at said second voltage from said voltage converter at a predetermined current value, irrespective of power consumption in said load;
   a calculation circuit for calculating a current value of power consumed in said load; and
   a charging battery, which is chargeable with a portion of power supplied from said voltage converter or which supplies power to said load,
   wherein:
   if said current value of power consumption calculated by said calculation circuit is smaller than said predetermined current value, said constant current circuit makes said charging battery receive power corresponding to a difference between said predetermined current value and said current value of power consumption thereby charging said charging battery; and
   if said current value of power consumption calculated by said calculation circuit is greater than said predetermined current value, said constant current circuit makes said charging battery to supply power corresponding to the difference between said predetermined current value and said current value of power consumption.

2. The control circuit apparatus according to claim 1, wherein said load is a second voltage converter for converting a voltage of power supplied from said constant current circuit, from said second voltage to a third voltage.

3. The control circuit apparatus according to claim 1, wherein said predetermined current value is equal to a current value where said first voltage converter is operating at a maximum conversion efficiency.

4. The control circuit apparatus according to claim 3, wherein said current value is approximately 300 mA.

5. A power supply circuit control method comprising the steps of:
   converting a voltage of power to be supplied to a load in a subsequent stage, from a first voltage to a second voltage by a voltage converter with the use of thin film choke coil; and
   maintaining a current value of power supplied at said second voltage from said voltage converter at a predetermined current value by using a constant current circuit, irrespective of power consumption in said load;
   calculating a current value of power consumed in said load by a calculating circuit; and
   charging a charging battery with a portion of power supplied from said voltage converter or supplying power to said load from said charging battery,
   wherein:
   if said current value of power consumption calculated by said calculation circuit is smaller than said predetermined current value, said constant current circuit makes said charging battery receive power corresponding to a difference between said predetermined current value and said current value of power consumption thereby charging said charging battery; and
   if said current value of power consumption calculated by said calculation circuit is greater than said predetermined current value, said constant current circuit makes said charging battery to supply power corresponding to the difference between said predetermined current value and said current value of power consumption.

6. The power supply circuit control method according to claim 5, wherein said predetermined current value is equal to a current value where said first voltage converter is operating at a maximum conversion efficiency.

7. The power supply circuit control method according to claim 6, wherein said current value is approximately 300 mA.

* * * * *